(12) United States Patent
Meitzler et al.

(10) Patent No.: US 11,927,691 B2
(45) Date of Patent: Mar. 12, 2024

(54) PORTABLE VEHICLE SENSOR CALIBRATION APPARATUS HAVING A SUCTION MECHANISM

(71) Applicant: Robert Bosch GmbH, Stuttgart (DE)

(72) Inventors: Robert Meitzler, Warren, MI (US); Michael Shevela, Harrison Township, MI (US); Richard Martin, Clinton Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 744 days.

(21) Appl. No.: 17/047,622

(22) PCT Filed: Apr. 10, 2019

(86) PCT No.: PCT/EP2019/059071
§ 371 (c)(1),
(2) Date: Oct. 14, 2020

(87) PCT Pub. No.: WO2019/206633
PCT Pub. Date: Oct. 31, 2019

(65) Prior Publication Data
US 2021/0048510 A1    Feb. 18, 2021

Related U.S. Application Data

(60) Provisional application No. 62/661,124, filed on Apr. 23, 2018.

(51) Int. Cl.
*G01S 13/931* (2020.01)
*B60W 50/00* (2006.01)
*G01S 7/40* (2006.01)

(52) U.S. Cl.
CPC .............. *G01S 7/40* (2013.01); *B60W 50/00* (2013.01); *G01S 13/931* (2013.01); *B60W 2050/0083* (2013.01)

(58) Field of Classification Search
CPC ........... B60W 2050/0083; B60W 50/00; G01S 13/931; G01S 7/40
See application file for complete search history.

(56) References Cited

U.S. PATENT DOCUMENTS 2,488,263 A * 11/1949 Bishman .................. B60R 9/02
224/559
2,675,983 A * 4/1954 King ....................... G09F 21/04
40/643

(Continued)

FOREIGN PATENT DOCUMENTS

DE    20 2005 002 845 U1    6/2005
DE       202005002845 U1 *  6/2005    ........... G01S 7/4026

(Continued)

OTHER PUBLICATIONS

International Search Report corresponding to PCT Application No. PCT/EP2019/059071, dated Jul. 29, 2019 (4 pages).

*Primary Examiner* — Timothy A Brainard
(74) *Attorney, Agent, or Firm* — Maginot, Moore & Beck LLP

(57) ABSTRACT

A portable vehicle sensor calibration apparatus having an anchor mechanism such that the apparatus may be mounted upon a surface. The anchor mechanism may comprise a suction cup mechanism. The vehicle sensor calibration apparatus may comprise a second anchor mechanism. The vehicle sensor calibration apparatus may be operable to mount onto a body of a support vehicle other than the vehicle having sensors requiring calibration.

15 Claims, 9 Drawing Sheets

(56) References Cited

U.S. PATENT DOCUMENTS

| | | | | |
|---|---|---|---|---|
| 9,170,101 | B2* | 10/2015 | Stieff | G01S 13/931 |
| 2012/0224171 | A1* | 9/2012 | Yotz | G01M 11/064 |
| | | | | 356/121 |
| 2013/0201491 | A1 | 8/2013 | Ashford et al. | |
| 2015/0266426 | A1* | 9/2015 | Woiden | B60R 1/078 |
| | | | | 29/428 |
| 2019/0004147 | A1* | 1/2019 | Conrad | G01S 7/4004 |
| 2019/0064320 | A1* | 2/2019 | Zack | G01S 7/40 |

FOREIGN PATENT DOCUMENTS

| | | |
|---|---|---|
| DE | 10 2013 005 087 A1 | 3/2014 |
| DE | 20 2015 106 939 U1 | 5/2016 |
| WO | 2018/067354 A1 | 4/2018 |

* cited by examiner

PORTABLE VEHICLE SENSOR CALIBRATION APPARATUS HAVING A SUCTION MECHANISM

CROSS-REFERENCE TO RELATED APPLICATIONS

This application is a 35 U.S.C. § 371 National Stage Application of PCT/EP2019/059071, filed on Apr. 10, 2019, which claims the benefit of priority of U.S. provisional application Ser. No. 62/661,124, filed on Apr. 23, 2018, the disclosures of which are incorporated herein by reference in their entirety.

TECHNICAL FIELD

This disclosure relates to the calibration of sensors, and in particular sensors using radar, optical, or sonic signals disposed within a vehicle for use with an Advanced Driver Assistance System.

BACKGROUND

In vehicles having an Advance Driver Assistance System, the associated sensors require calibration to achieve proper operation. Calibration may be required as part of regular maintenance, or on particular occasions such as the repair or replacement of the windshield or other glass components of the vehicle. Certain vehicular glass repairs may be completed on-site, such as at the vehicle owner's home or place of business. Current calibration tools are typically bulky and stationary, and require the vehicle to be brought into an automotive service center or similar controlled environment. It is therefore desirable to have a calibration apparatus that is sufficiently mobile that the calibration procedure may be performed at a desired location outside of an automotive service center.

SUMMARY

One aspect of this disclosure is directed to a vehicle sensor calibration apparatus operable to be mounted onto the body of a support vehicle during a calibration operation for the sensors of a subject vehicle. The calibration apparatus may mount upon the support vehicle using at least one suction cup. The calibration apparatus may comprise an upright support, a crossbar member coupled to the upright support, and a reflective target coupled to the crossbar member and providing a reference target for vehicle sensors during a calibration operation. The calibration apparatus may comprise a number of alignment instruments operable to align the reflective target with a reference position of the subject vehicle. The calibration apparatus may comprise additional features to adjust the alignment of the reflective target with respect to the subject vehicle within a specified tolerance of the calibration operation.

Another aspect of this disclosure is directed to a vehicle sensor calibration apparatus comprising a vertical support member, a first anchor mechanism, a crossbar member, a reflective target, and a number of alignment instruments. The vehicle sensor calibration apparatus may advantageously be unassembled and re-assembled to enhance portability. The vertical support member may be detachably coupled to the first anchor mechanism, and the first anchor mechanism may comprise a suction cup. The crossbar member may be detachably coupled to vertical support member and comprise a target mount. The reflective target may be detachably coupled to the target mount. The number of alignment instruments may be detachably coupled to the crossbar member or the reflective target, and may further be operable to align the vehicle sensor calibration apparatus with a reference for a calibration operation when the vehicle sensor calibration is fully assembled and mounted upon a suitable surface.

A further aspect of this disclosure is directed to a vehicle calibration system comprising a support vehicle a vehicle sensor calibration apparatus, and a number of alignment instruments. The vehicle sensor calibration apparatus may comprise a first anchor mechanism comprising a suction cup operable to mount to a body of the support vehicle, a vertical support member operable to couple to the first anchor mechanism, a second anchor mechanism operable to mount to the body of the support vehicle and further couple to the vertical support member, a crossbar member operable to couple to the upright support member, and a reflective target operable to couple to the crossbar member. In some embodiments, the vehicle calibration system may further comprise a diagnostic dongle configured to interface with the diagnostic port of a subject vehicle having sensors needing calibration.

The above aspects of this disclosure and other aspects will be explained in greater detail below with reference to the attached drawings.

BRIEF DESCRIPTION OF THE DRAWINGS

FIG. 2b is an exploded view of the vehicle sensor calibration apparatus of FIG. 2a.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
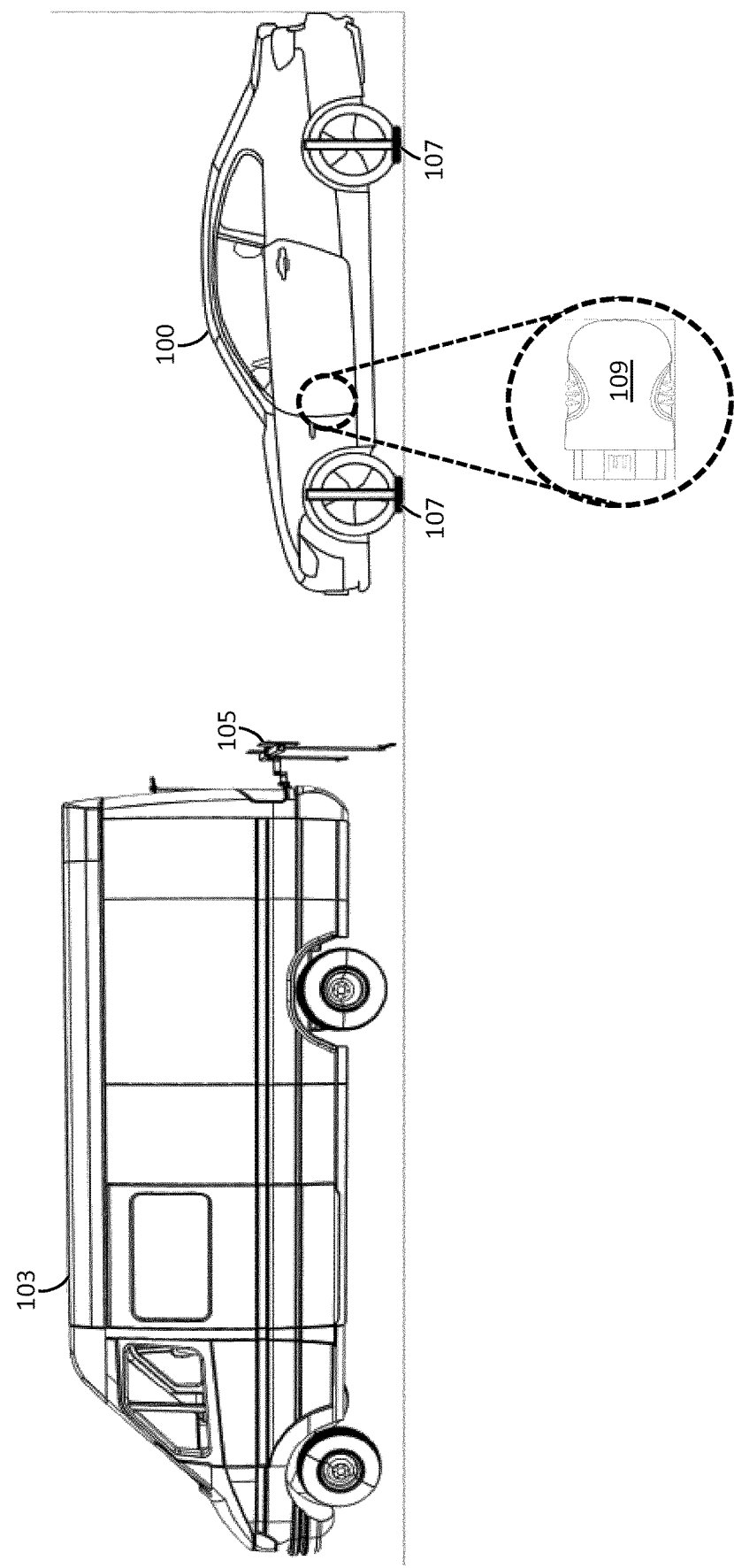
FIG. 1 is a depiction of a vehicle sensor calibration apparatus positioned with respect to a subject vehicle during a calibration operation.

FIG. 1 depicts a vehicle sensor calibration system during a calibration operation directed to the sensors of a subject vehicle 100 according to one embodiment of the teachings disclosed herein. The vehicle sensor calibration system comprises a support vehicle 103, a mounting structure 105, a number of reference structures 107 and a calibration processor 109. Mounting structure 105 is operable to provide a calibration target for the sensors of subject vehicle 100 and operable to mount upon support vehicle 103 for the duration of the calibration operation. The support vehicle 103 may advantageously provide stabilization of the position of the mounting structure 105 in adverse conditions, such as wind or uneven surfaces.

The proper positioning of mounting structure 105 may be determined by the specification of the sensors of subject vehicle 100, and reference structures 107 provide reference points for the positioning of mounting structure 105 prior to initiating the calibration operation. The calibration processor 109 may be operable to control the sensors of subject vehicle 100 during the calibration operation.

In the depicted embodiment, support vehicle 100 comprises a utility van, but other embodiments may comprise forms of support vehicle such as trucks, sedans, trailers, or any other alternative vehicle recognized by one of ordinary skill in the art without deviating from the teachings disclosed herein. In the depicted embodiment, mounting structure 105 mounts to a rear portion of the body of support vehicle 105, but other embodiments may comprise other arrangements without deviating from the teachings disclosed herein. In some embodiments, mounting structure 105 may be configured to mount to surfaces other than the body of a vehicle, such as a wall, window, a freestanding structure, a specialized structure, or any other surface without deviating from the teachings disclosed herein.

In the depicted embodiment, the vehicle sensors of subject vehicle 100 may comprise radar sensors, but other embodiments may comprise lidar sensors, optical sensors, cameras, laser sensors, infrared sensors, ultrasonic sensors, or any other alternative sensor known to one of ordinary skill in the art without deviating from the teachings disclosed herein. In the depicted embodiment, subject vehicle 100 comprises a sedan, but other embodiments may comprise a van, truck, bus, motorcycle, trailer, caravan, or any other vehicle known to one of ordinary skill in the art. In the depicted embodiment, mounting structure 105 is positioned for a calibration of forward-facing sensors of subject vehicle 100, but other embodiments may comprise other arrangements of mounting structure 105 with respect to subject vehicle 100 without deviating from the teachings disclosed herein.

In the depicted embodiment, reference structures 107 may comprise a pair of a number of upright members that are aligned to subject vehicle 100 according to a specification of the sensors of subject vehicle 100. The alignment of reference structures 107 may be verified using line-generating laser levels, but other embodiments may comprise other configurations such as tape measures, rulers, range-finders, angular measurement instruments, proprietary structures, fixed-distance cables, fixed-distance bars, or any other measuring instrument recognized by one of ordinary skill in the art without deviating from the teachings disclosed herein. Some embodiments may comprise a different number of reference structures 107 without deviating from the teachings disclosed herein. Some embodiments may comprise alternative configurations of reference structures 107 without deviating from the teachings disclosed herein.

In the depicted embodiment, calibration processor 109 comprises a diagnostic dongle configured to interface with a diagnostic port of subject vehicle 100, but other embodiments may comprise other configurations without deviating from the teachings disclosed herein. In some embodiment, calibration processor 109 may comprise a portable computing device, a laptop computer, a tablet computer, a smart phone, or any other alternative device known to one of ordinary skill in the art without deviating from the teachings disclosed herein.

Figure 2A:
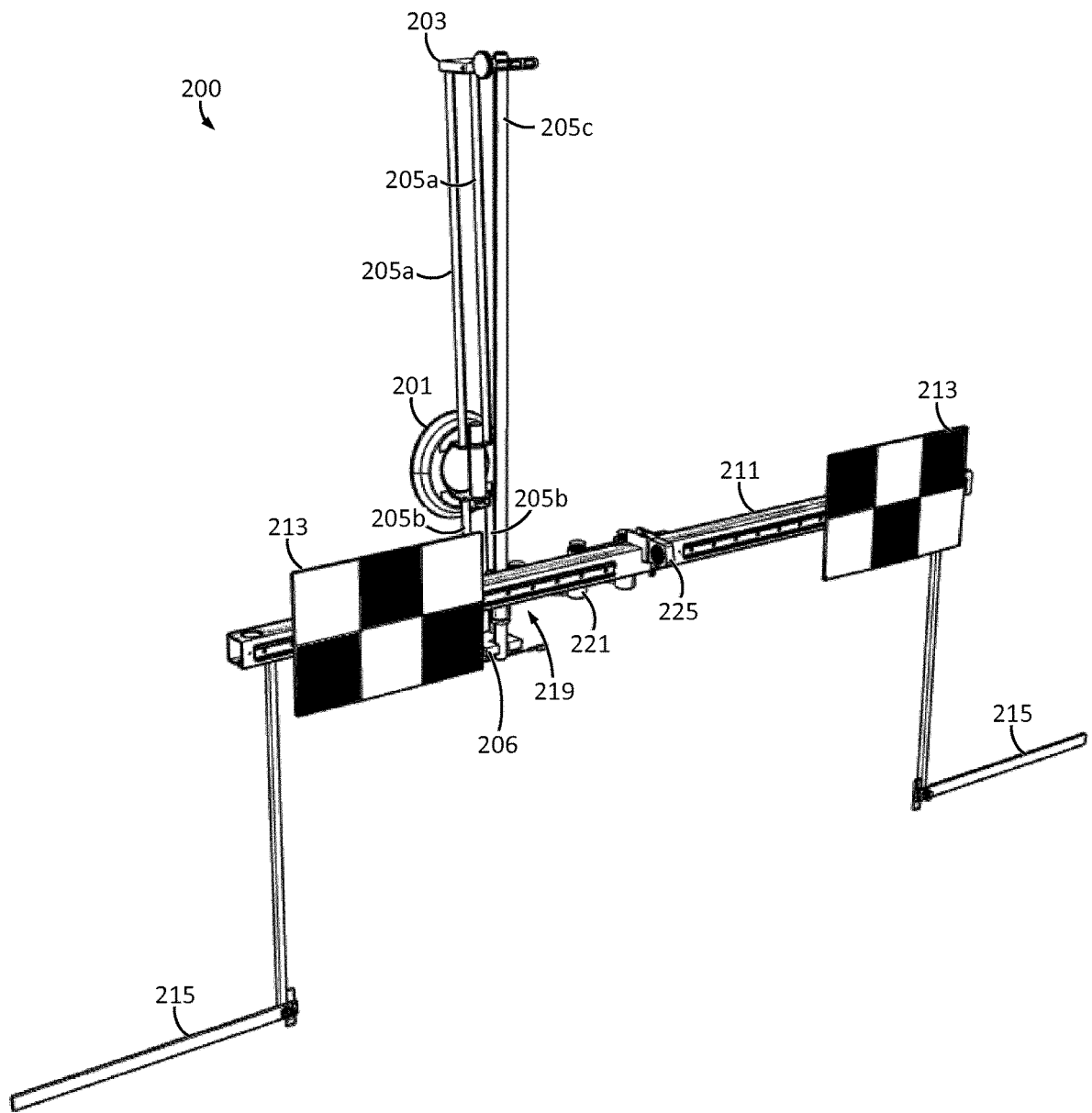
FIG. 2a is an illustration of a vehicle sensor calibration apparatus.
Figure 2B:
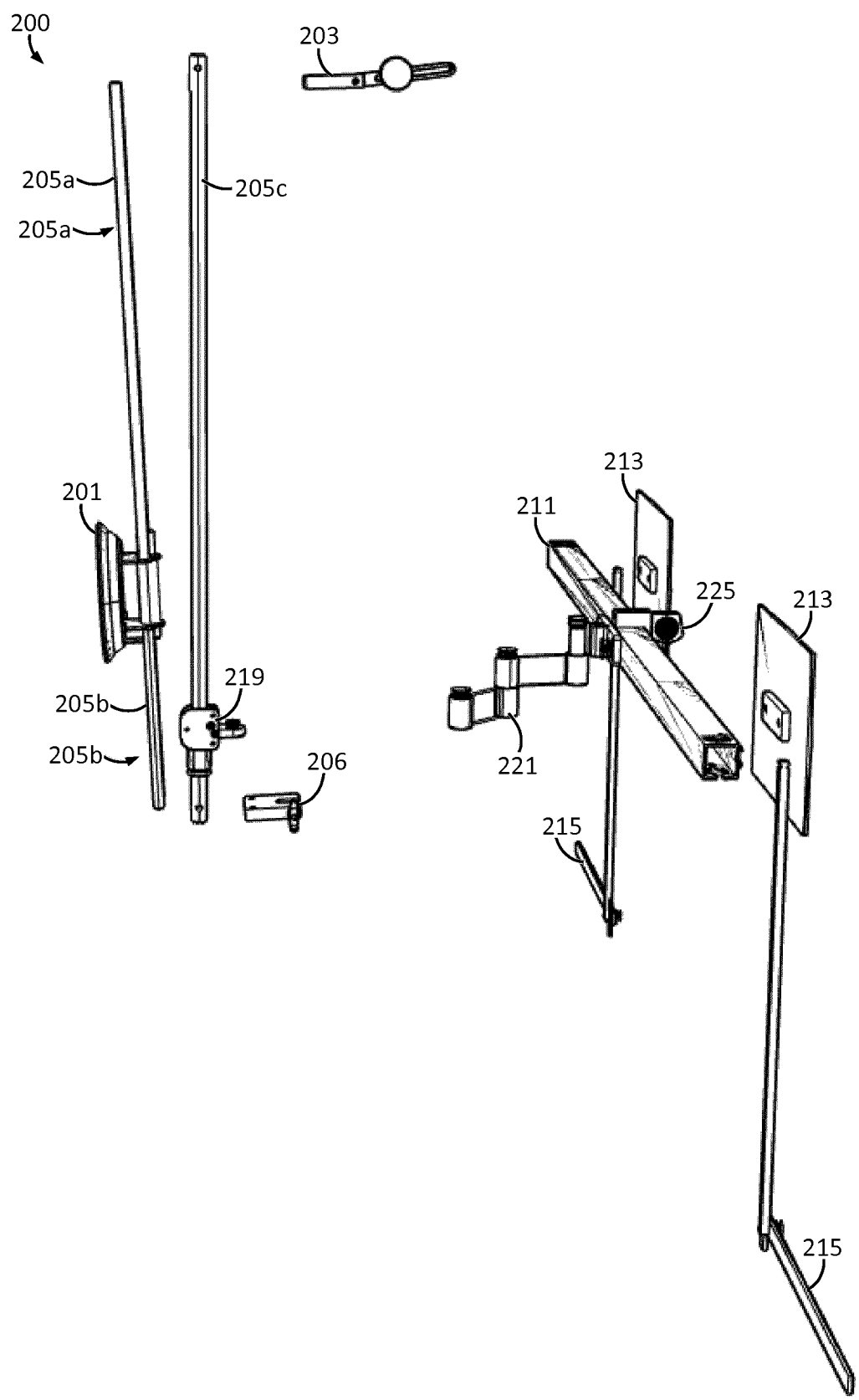

FIG. 2a and FIG. 2b illustrate a mounting structure 200 suitable for use in the vehicle sensor alignment system according to one embodiment of the teachings disclosed herein. FIGS. 2a and 2b each represent the same embodiment of a mounting structure 200, with FIG. 2a presenting a view of the assembled mounting structure 200, and FIG. 2b presenting an exploded view of the individual components of mounting structure 200.

In the depicted embodiment, mounting structure 200 comprises a first anchor mechanism in the form of a suction mount 201 and a second anchor mechanism in the form a door hook 203. Each of the anchor mechanism provide support for mounting structure 200 to detachably couple to the body of a support vehicle. The suction mount 201 may be operable to provide stability by detachably coupling to the body of the support vehicle using a suction force on the body of the support vehicle. Suction mount 201 may be operable to create a vacuum capable of supporting a specified percentage of the weight of mounting structure 200. In the depicted embodiment, suction mount 201 may be operable to support up to 70 pounds of force, but other embodiments may comprise alternative configurations without deviating from the teachings disclosed herein. Door hook 203 may be operable to fit into a door jamb of the support vehicle to provide stability for mounting structure 200. In the depicted embodiment, door hook 203 may be configured to fit in between a door and its jamb of the support vehicle at the top of the door when closed, but other embodiments may comprise other configurations without deviating from the teachings disclosed herein. In some embodiments, door hook 203 may be configured to fit between a door and its jamb at other sides of the door, or in other configurations of doors in the support vehicle. In some embodiments, door hook 203 may be configured to provide stability to mounting structure 200 when an associated door is at least partially open.

In the depicted embodiment, mounting structure 200 comprises a number of vertical support members 205 that may be operable to provide stability to mounting structure 200 and provide connection between the anchor mechanisms. In the depicted embodiment, a pair of vertical support members 205a provide a connection between suction mount 201 and door hook 203, but other embodiments may comprise a different number of vertical support members 205a providing a connection between the anchor mechanisms without deviating from the teachings disclosed herein. In the depicted embodiment, a pair of vertical support members 205b provide connection between suction mount 201 and a vertical support assembly 206. Vertical support assembly 206 provides a focal point to mounting structure 200 that may stabilize the arrangement of vertical support members 205 and provide a stable coupling point for other components of mounting structure 200. In the depicted embodiment, an additional vertical support member 205c connects door hook 203 to the vertical support assembly 206. Vertical support member 205c may stabilize door hook 203 when engaged within a door of a support vehicle and stabilize the mounting structure 200 while mounted onto the body of the vehicle. Other embodiments may comprise other arrangements without deviating from the teachings disclosed herein. In some embodiments, mounting structure 200 may comprise only some of vertical support members 205a, 205b, or 205c. In some embodiments, mounting structure 200 may comprise a different number of any of vertical support members 205a, 205b, or 205c. In some embodiments, mounting structure 200 may comprise additional or differently configured vertical support members 205 than those illustrated in FIG. 2 without deviating from the teachings disclosed herein.

In the depicted embodiment, a crossbar member 211 may be operable to support a number of reflective targets 213 during the calibration operation. Reflective targets 213 may be operable to provide a reflection surface for the sensors of a vehicle during calibration. Because the positioning of reflective targets 213 must be within the specification of the sensors, mounting structure 200 may comprise a number of components operable to adjust the position and angle of the reflective targets 213 with respect to the vehicle sensors while the mounting structure 200 is mounted upon a supporting surface during a calibration operation. Reflective targets 213 may be adjustably positioned along the length of crossbar member 211 to accommodate the specified positioning of a wide variety of vehicle sensors. In the depicted embodiment, the horizontal placement of mounting structure 200 for the calibration operation may be measured using a pair of alignment brackets 215 detachably coupled to crossbar member 211. Alignment brackets 215 may provide a measurement of the alignment of mounting structure 200 with respect to a reference structure (see FIG. 1) aligned with a subject vehicle for calibration according to a specification for the vehicle sensors of the subject vehicle. In the depicted embodiment, mounting structure 200 comprises a pair of alignment brackets 215, but other embodiments may comprise a different number of alignment brackets 215 without deviating from the teachings disclosed herein. Some embodiments may not comprise alignment brackets 215.

In order to accommodate a wider variety of vehicles, the vertical positioning of reflective targets 213 may be adjusted using a vertical adjustment mechanism 219. Vertical adjustment mechanism 219 may be operable to adjust the vertical position of the reflective targets 213 relative to the surface upon which a subject vehicle rests. In the depicted embodiment, vertical adjustment mechanism 219 may comprise a locking roller assembly, but other embodiments may comprise a telescoping mechanism, a graduated locking push-tab mechanism, a shaft-and-collar mechanism, or any other adjustment mechanism recognized by one of ordinary skill in the art without deviating from the teachings disclosed herein.

Additional adjustments to the positioning of mounting structure 200 may be made using a distance/angle adjustment mechanism 221. The distance/angle adjustment mechanism 221 in the depicted embodiment comprises of interlocking pivot members, wherein each of the pivot members permits angular adjustment of the pivot members with respect to their interlocked components. One of the pivot members interlocks with vertical adjustment mechanism 219, and another of the pivot members interlocks with crossbar member 211. In the depicted embodiment, each of the pivot members may interlock with its neighboring component using a screw mechanism that may also be operable to make fine adjustments to vertical position of the reflective targets 213. In the depicted embodiment, the pivot members may be arranged to make fine adjustments to the distance between reflective targets 213 and the sensors of a subject vehicle. Other embodiments may comprise a different number of pivot members without deviating from the teachings disclosed herein. Other embodiments may comprise alternative configurations of distance/angle adjustment mechanism 221 without deviating from the teachings disclosed herein. Other embodiments may comprise configurations that permit adjustments to distance or angle, but not both without deviating from the teachings disclosed herein. Some embodiments may comprise separate mechanisms to adjust distance and angle respectively without deviating from the teachings disclosed herein. Some embodiments may not comprise a distance/angle adjustment mechanism 221.

In the depicted embodiment, mounting structure 200 also comprises a distance instrument 225 detachably coupled to crossbar member 221. Distance instrument 225 is operable to measure the distance of the surface of reflective targets 213 from a reference point. In the depicted embodiment, distance instrument 225 may comprise a tape measure, but other embodiments may comprise an optical rangefinder, ultrasonic rangefinder, fixed-length cable, fixed-length member, or any other alternative measurement instrument known to one of ordinary skill in the art without deviating from the teachings disclosed herein.

In some embodiments, mounting structure 200 may comprise additional components for alignment and positioning with respect to a vehicle sensor during a calibration operation. Some embodiments may include one or more level instruments such as a spirit level, digital level meter, bubble meter, angle-measuring compass, or distance instruments without deviating from the teachings disclosed herein.

Figure 3:
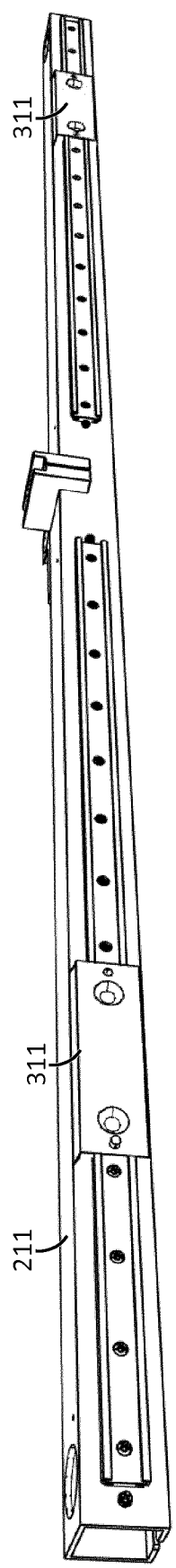
FIG. 3 is an illustration of a crossbar member in a vehicle sensor calibration apparatus.

FIG. 3 is a close-up view of crossbar member 211 according to the embodiment depicted in FIG. 2. Reflective targets 213 (not shown; see FIG. 2) are operable to detachably couple to crossbar member 211 via a mounting bracket 311. In the depicted embodiment, crossbar member 211 comprises a pair of mounting brackets, but other embodiments may comprise a different number of mounting brackets without deviating from the teachings disclosed herein. In the depicted embodiment, mounting brackets 311 comprise a magnetic set-pin bracket, but other embodiments may comprise other configurations without deviating from the teachings disclosed herein.

Figure 4A:
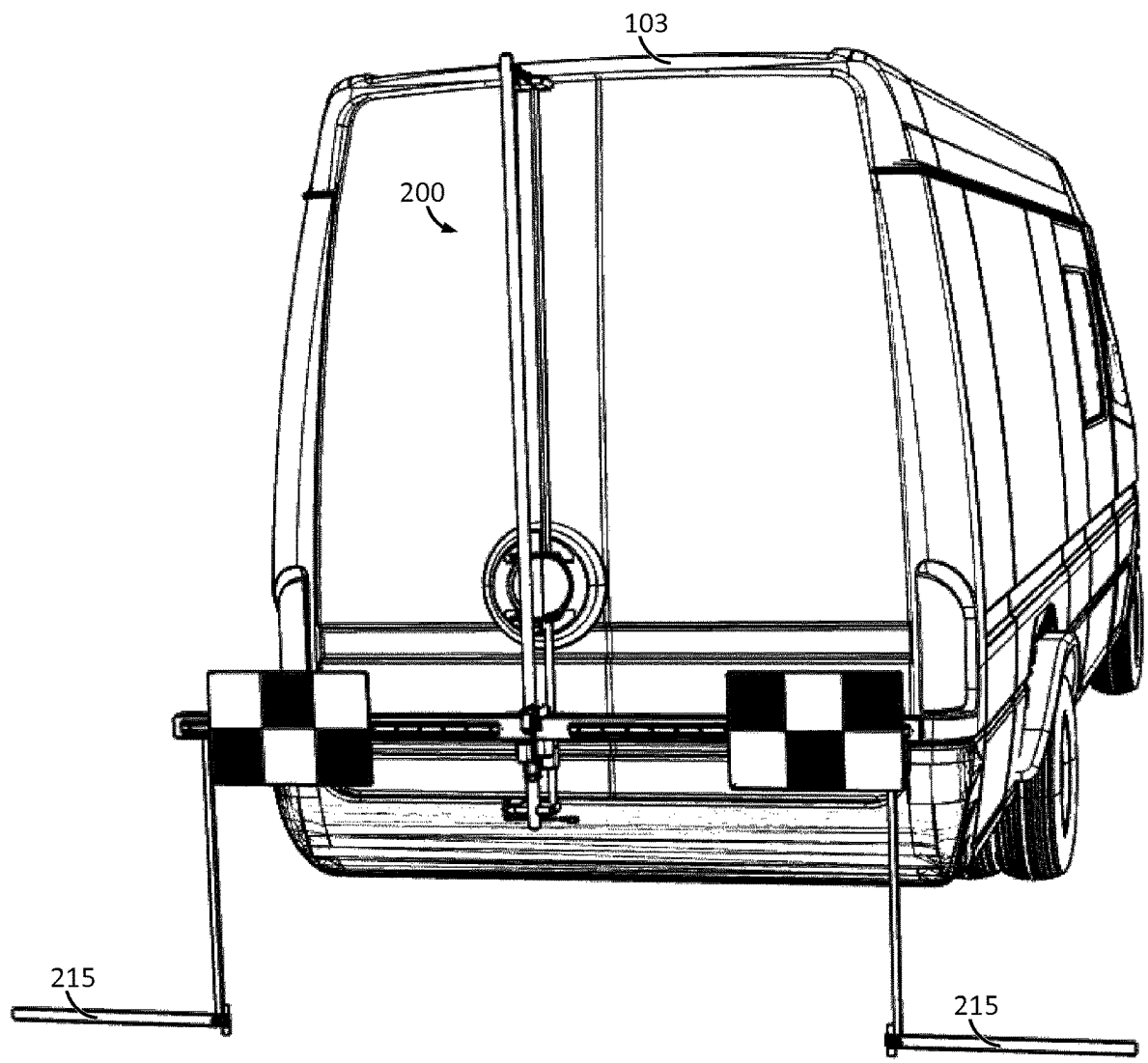
FIG. 4a is an illustration of the vehicle sensor calibration apparatus of FIG. 2a during an alignment operation.
Figure 4B:
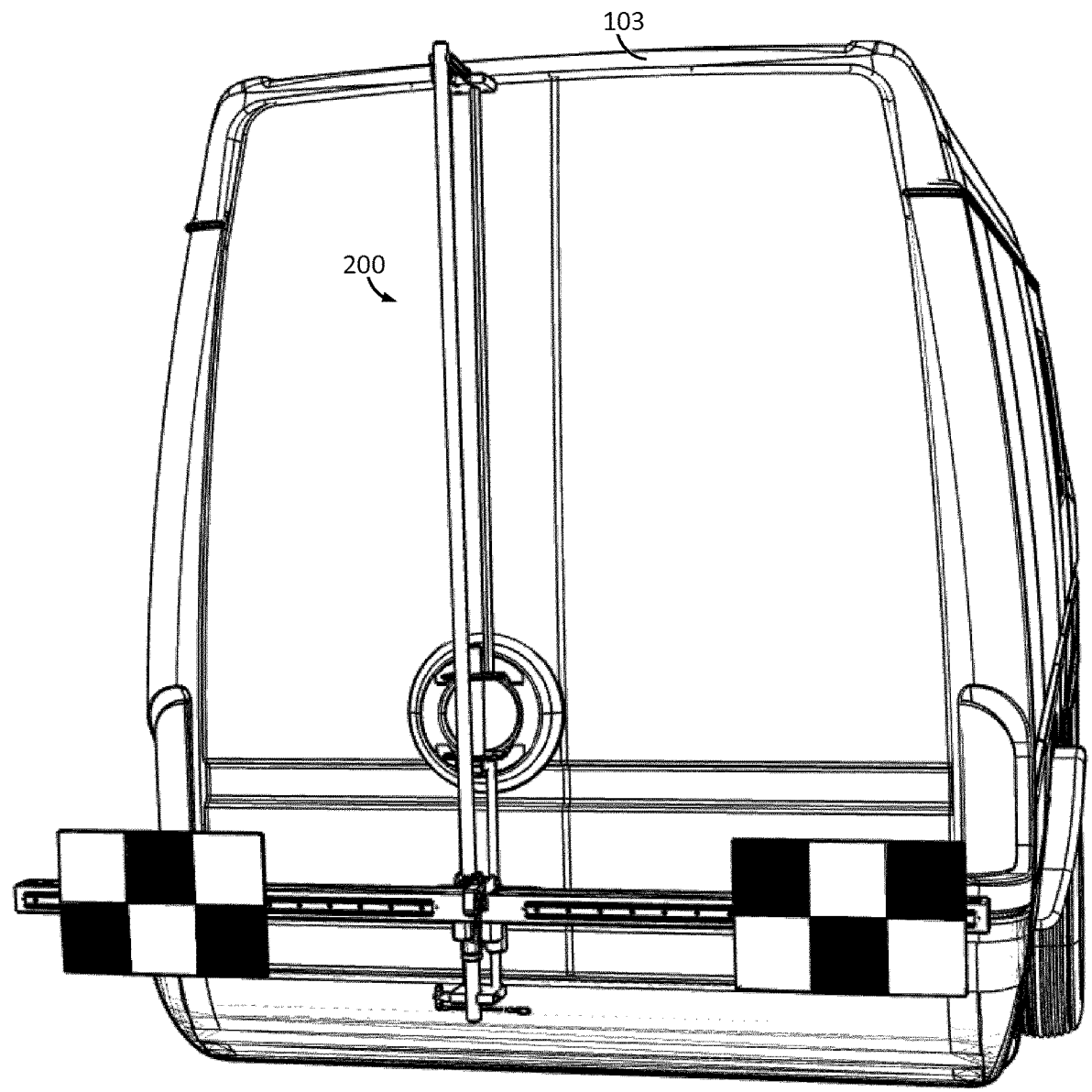
FIG. 4b is an illustration of the vehicle sensor calibration apparatus of FIG. 2a during a sensor calibration operation.

FIG. 4a illustrates a mounting structure 200 (see FIG. 2) mounted upon a support vehicle 103 (see FIG. 1) during a calibration operation with each of alignment brackets 215 coupled thereto. FIG. 4b illustrates the mounting structure 200 mounted upon the same support vehicle 103 with alignment brackets 215 decoupled therefrom.

Figure 5:
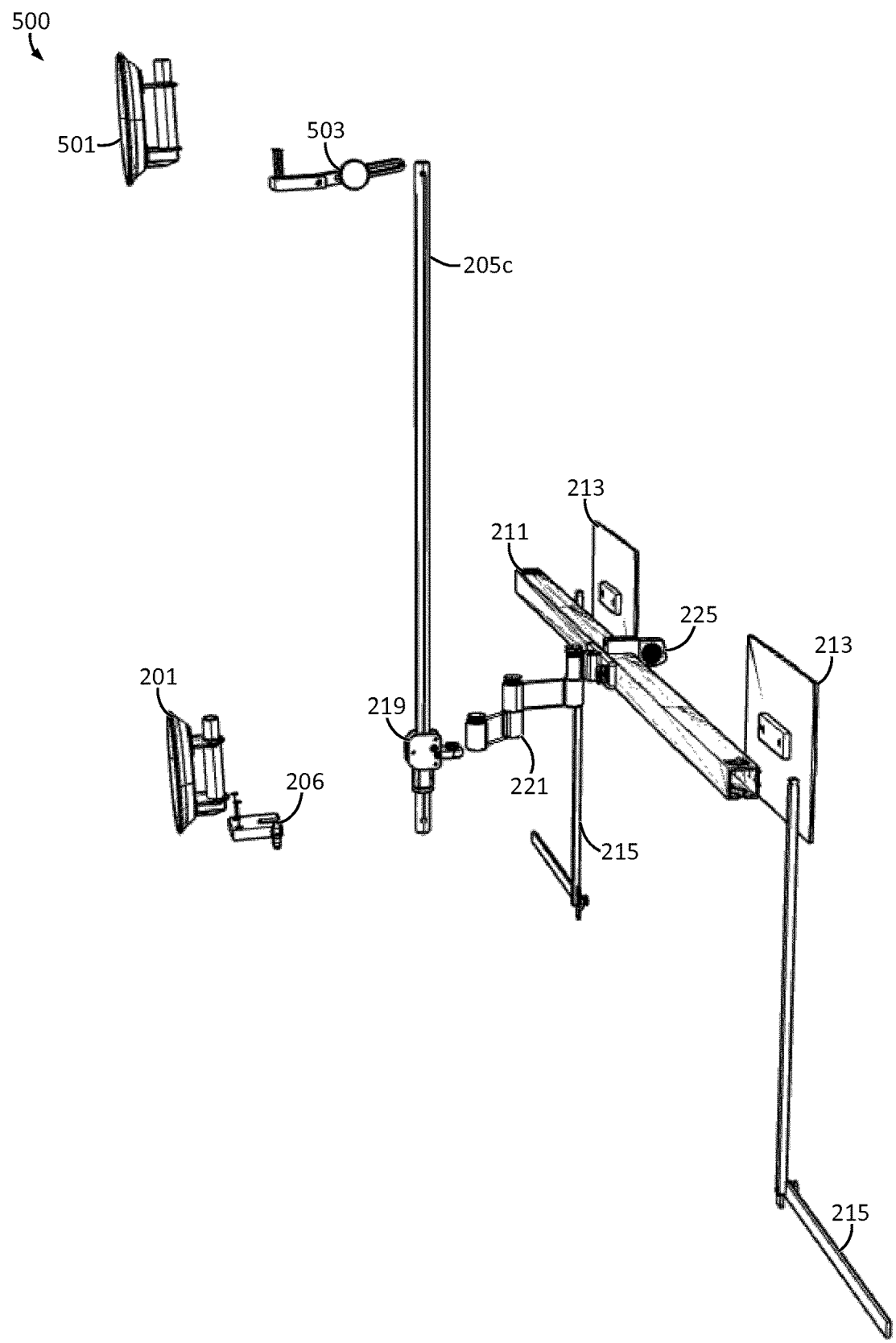
FIG. 5 is an exploded view of a vehicle sensor calibration apparatus.

FIG. 5 depicts an exploded view of an alternate embodiment of a mounting structure 500. Mounting structure 500 is similar to mounting structure 200 (see FIG. 2b) and comprises many of the same components having the same configuration. Mounting structure 500 differs from mounting structure 200 in that it does not comprise vertical support members 205a or 205b (see FIG. 2) and instead only comprises vertical support member 205c, but other embodiments may comprise other configurations of upright support members 205 without deviating from the teachings disclosed herein. Mounting structure 500 further comprises a second suction mount 501 instead of a door hook 203 (see FIG. 2). Second suction mount 501 may be configured to provide a stable suction mounting at a second point on a mounting surface. Suitable mounting surfaces may comprise the body of a support vehicle (see FIG. 1), but other embodiments may advantageously be mounted onto other suitable surfaces without deviating from the teachings disclosed herein. Other mounting surfaces may comprise structures comprised of glass, metals, alloys, or any other alternative material known to one of ordinary skill in the art without deviating from the teachings disclosed herein. Non-vehicular mounting structures may advantageously be utilized in environments or conditions in which a support vehicle is undesirable, such as particularly small working environments. Non-vehicular mounting structures may advantageously comprise collapsible or folding configurations that may be portable, including some embodiments operable to be transported by a support vehicle between calibration operations.

In the depicted embodiment, second suction mount 501 may be functionally identical to suction mount 201, but other embodiments may comprise other configurations without deviating from the teachings disclosed herein. In the depicted embodiment, second suction mount 501 may be operable to create a vacuum capable of supporting a specified percentage of the weight of mounting structure 500. By way of example and not limitation, second suction mount 501 may be operable to create a vacuum capable of supporting half the weight of mounting structure 500. In the depicted embodiment, suction mount 501 may be operable to support up to 70 pounds of force, but other embodiments may comprise alternative configurations without deviating from the teachings disclosed herein.

In the depicted embodiment, second suction mount 501 is operably coupled to vertical support 205c using a second vertical support assembly 503. The second vertical support assembly 503 provides a focal point to mounting structure 500 that may stabilize the arrangement of vertical support member 205c and provide a stable coupling point for other components of mounting structure 500.

Figure 6A:
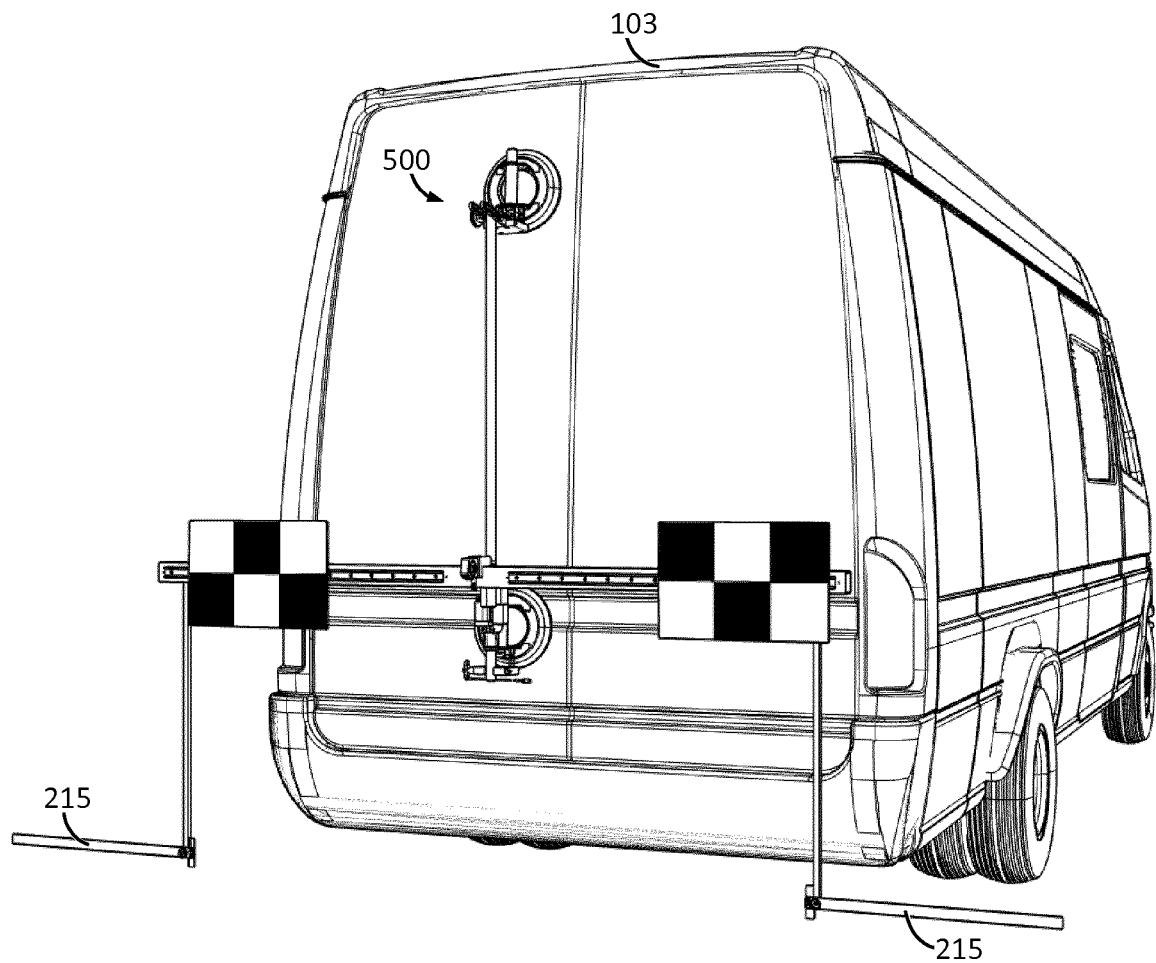
FIG. 6a is an illustration of a vehicle sensor calibration apparatus during an alignment apparatus.
Figure 6B:
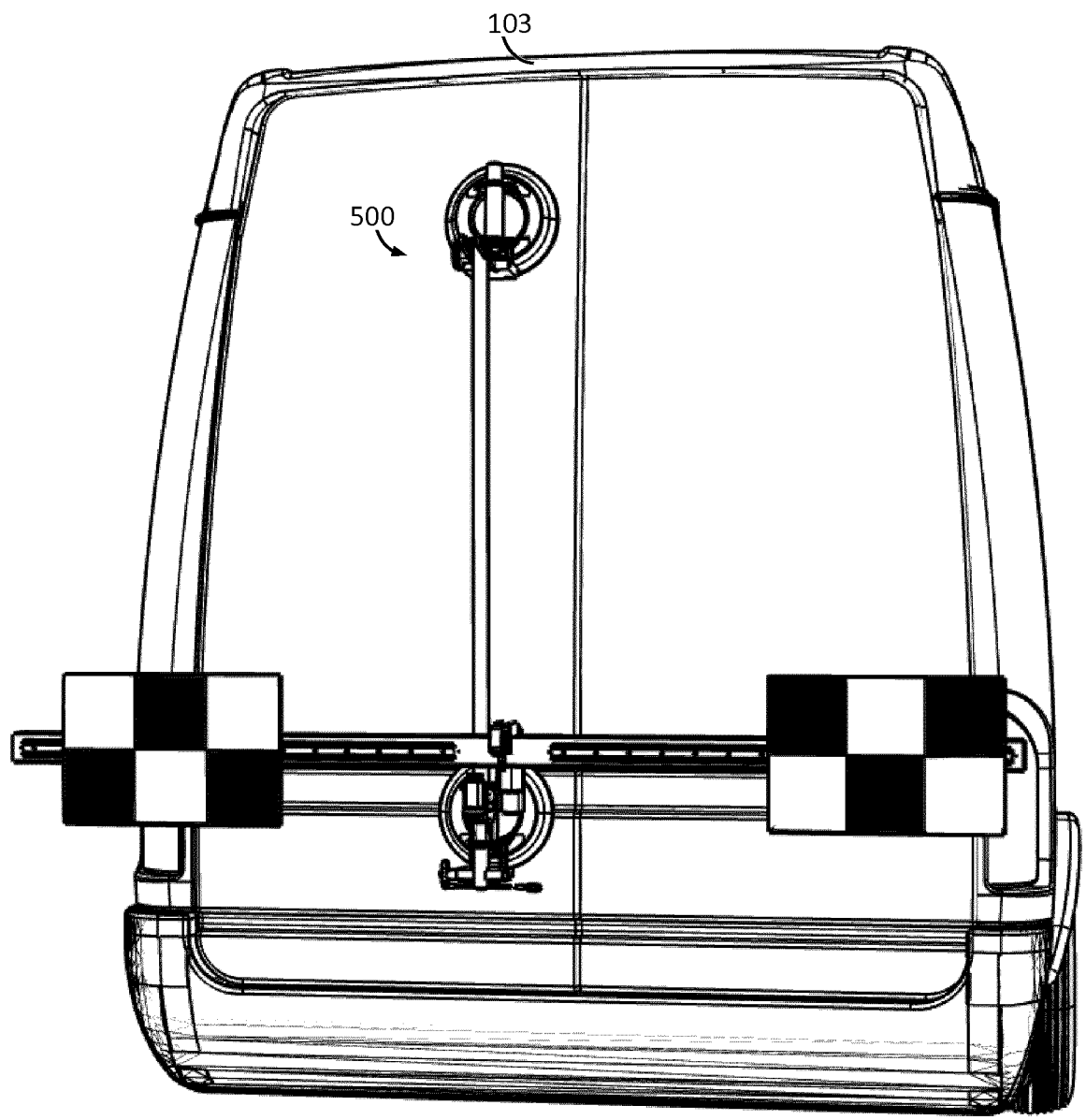
FIG. 6b is an illustration of the vehicle sensor calibration apparatus of FIG. 5a during a sensor calibration operation.

FIG. 6a illustrates a mounting structure 500 (see FIG. 5) mounted upon a support vehicle 103 (see FIG. 1) during a calibration operation with each of alignment brackets 215 coupled thereto. FIG. 6b illustrates the mounting structure 500 mounted upon the same support vehicle 103 with alignment brackets 215 decoupled therefrom.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle sensor calibration apparatus comprising:
   a vertical support member;
   a first anchor mechanism comprising a first suction cup detachably coupled to the vertical support member operable to mount onto a support surface;
   a crossbar member detachably coupled to the vertical support member and positionable along the length of the vertical support member, the crossbar member comprising a target mount operable to be positioned along the length of the crossbar member;
   a reflective target detachably coupled to the target mount; and
   a number of alignment instruments detachably coupled to the crossbar member and operable to measure an alignment of the vehicle sensor calibration apparatus with respect to a reference point.

2. The vehicle sensor calibration apparatus of claim 1, further comprising a second anchor mechanism comprising a second suction cup operable to mount onto the support surface.

3. The vehicle sensor calibration apparatus of claim 1, further comprising a second anchor mechanism comprising a door hook operable for placement into a doorjamb of a support vehicle, wherein the support surface comprises a body of the support vehicle.

4. The vehicle sensor calibration apparatus of claim 1, further comprising a roller assembly operable to position the crossbar member along the length of the vertical support member.

5. The vehicle sensor calibration apparatus of claim 1, wherein the target mount comprises a magnetic mount mechanism.

6. A vehicle sensor calibration apparatus comprising:
   a vertical support member;
   a first anchor mechanism comprising a suction cup operable to mount onto a support surface, the first anchor mechanism operable to detachably couple to the vertical support member;
   a crossbar member operable to detachably couple to the vertical support member and positionable along the length of the vertical support member, the crossbar member comprising a target mount operable to be positioned along the length of the crossbar member;
   a reflective target operable to detachably couple to the target mount; and
   a number of alignment instruments operable to detachably couple to the crossbar member and to measure the alignment of the vehicle sensor calibration apparatus with respect to a reference point.

7. The vehicle sensor calibration apparatus of claim 6, wherein the number of alignment instruments are operable to measure distance from the reference point and an angle of the reflective target with respect to the reference point.

8. The vehicle sensor calibration apparatus of claim 6, further comprising a telescoping mechanism having a shaft collar to adjustably position the vertical support member.

9. The vehicle sensor calibration apparatus of claim 6, further comprising a rolling assembly mechanism to adjustably position the vertical support member.

10. A system for calibrating a sensor of a target vehicle, the system comprising:
    a support vehicle;
    a first anchor mechanism comprising a suction cup operable to detachably mount onto the body of the support vehicle;
    a vertical support member coupled to the first anchor mechanism;
    a second anchor mechanism coupled to the vertical support member and operable to detachably mount onto the body of the support vehicle;
    a crossbar member detachably coupled to the vertical support member and positionable along the length of the vertical support member, the crossbar member comprising a target mount operable to be positioned along the length of the crossbar member;
    a reflective target detachably coupled to the target mount, forming a crossbar-target structure when the reflective target is coupled to the target mount;
    a first alignment instrument detachably coupled to the crossbar member and operable to measure the alignment of the vehicle sensor calibration apparatus with respect to a reference point; and
    at least one second alignment instrument detachably coupled to the crossbar member and operable to measure an alignment of the crossbar member with respect to a reference structure which is not supported by the vertical support member.

11. The system of claim 10, wherein the reference structure comprises a freestanding structure operable to be aligned with a reference position of the target vehicle.

12. The system of claim 10, wherein the second anchor mechanism comprises a second suction cup.

13. The system of claim 10, wherein the second anchor mechanism comprises a door hook operable for placement into a doorjamb of the support vehicle.

14. The system of claim 10, further comprising a calibration processor operable to interface with the sensor of the target vehicle during a calibration operation.

15. The system of claim 14, wherein the calibration processor comprises a diagnostic dongle configured to interface with a diagnostic port of the target vehicle during the calibration operation.

* * * * *